United States Patent [19]

Lawther et al.

[11] Patent Number: 4,786,928
[45] Date of Patent: Nov. 22, 1988

[54] MIRROR SYSTEM FOR A SINGLE LENS REFLEX CAMERA

[75] Inventors: Joel S. Lawther; Richard F. Manley, both of Rochester; William L. Burnham, Leroy, all of N.Y.

[73] Assignee: Eastman Kodak Company, Rochester, N.Y.

[21] Appl. No.: 128,844

[22] Filed: Dec. 4, 1987

[51] Int. Cl.⁴ .............................................. G03B 19/12
[52] U.S. Cl. .................................................... 354/153
[58] Field of Search ......................... 354/150, 152–158

[56] References Cited

U.S. PATENT DOCUMENTS

| | | | |
|---|---|---|---|
| 589,349 | 8/1897 | Holst | 354/153 X |
| 713,629 | 11/1902 | Garfield | 354/153 X |
| 2,057,198 | 10/1936 | Marcussen | 95/42 |
| 2,949,073 | 8/1960 | Weiss | 354/155 |
| 2,980,001 | 4/1961 | Sauer et al. | 354/155 |
| 3,391,626 | 7/1968 | Ettischer et al. | 354/156 |
| 3,532,044 | 10/1970 | Shimomura | 95/42 |
| 3,675,557 | 7/1972 | Yokozato et al. | 95/42 |
| 3,680,458 | 8/1972 | Nomura | 354/152 |
| 4,114,172 | 9/1978 | Yao | 354/153 |
| 4,190,339 | 2/1980 | Arai | 354/156 |
| 4,204,758 | 5/1980 | Haynes | 354/152 |
| 4,319,825 | 3/1982 | Newton | 354/293 |
| 4,673,271 | 6/1987 | Alfredsson | 354/152 |

Primary Examiner—Donald A. Griffin
Attorney, Agent, or Firm—Roger A. Fields

[57] ABSTRACT

In a single lens reflex camera, a mirror can be positioned at an angle between the rear of the taking lens and the film to reflect the light rays that come through the lens, on to a focusing screen of the viewfinder, and it can be positioned out of the way to expose the film. The mirror is supported to swing forward toward the rear of the lens and downward to at least partially below the film, simultaneously, from its light-reflecting position to a non-reflecting inverted position substantially facing the bottom of the camera. This advantageously permits the back focus of the lens required to clear the mirror for movement from its light-reflecting position to out of the way to expose the film, to be reduced.

7 Claims, 3 Drawing Sheets

MIRROR SYSTEM FOR A SINGLE LENS REFLEX CAMERA

BACKGROUND OF THE INVENTION

1. Field of the Invention

The invention relates generally to the field of photography, and specifically to a mirror system for a single lens reflex camera. More particularly, the invention relates to a mirror system which is improved to reduce the clearance required for movement of its swingable mirror.

2. Description of the Prior Art

Typically in a single lens reflex camera, a flip-up mirror is located between the objective lens and the film. The mirror is normally disposed at an angle of 45°, centered on the optical axis of the objective lens, but it can flip up about a pivot pin at the top of the mirror to lie flat. When the mirror is disposed at the 45° angle, it reflects the rays of light that come through the objective lens, on to a ground glass screen in a viewfinder of the camera. A field lens and a penta-roof prism in the viewfinder direct the light rays through an eyelens at the rear of the camera to enable the subject to be photographed to be viewed through the objective lens. The prism has several reflecting surfaces which turn the image formed by the objective lens on the ground glass screen upright as well as right-way-round. When the mirror is flipped up to lie flat, it covers the underside of the ground glass screen and the light rays from the objective lens fall on the film. The positioning of the mirror is such that when an image of the subject to be photographed is focused on the ground glass screen, with the mirror at the 45° angle, the same image falls into focus on the film when the mirror is flipped out of the way.

In many reflex cameras, the mirror is moved out of the way by a spring which is released immediately before the shutter is actuated to take a picture in response to finger pressure against a shutter release button on the outside of the camera body. The mirror there has to be retensioned before every exposure (and in fact before an image can be observed again on the ground glass screen). On most reflexes this retensioning is coupled with the film transport and/or shutter tensioning. Alternatively, an instant return mirror may be employed. The mirror there flips back immediately after the exposure.

Movement of the flip-up mirror between its 45° position and its flipped-up position requires a fair amount of space. Consequently, the objective lens must have a sufficient back focus to provide ample clearance for the mirror movement. Various systems have been tried to reduce the clearance required. One of the earliest consists of supporting the mirror along its horizontal center axis, and swinging it back and up rather than hinging it at the top. More modern designs involve systems where the mirror drops down into the bottom of the camera housing, or folds up along its middle. Another variation, used in 18×24 mm miniature reflexes, is a sideways mirror movement. Since the 18×24 mm image is upright in the camera, this movement along the long side of the negative takes up less space.

SUMMARY OF THE INVENTION

According to the invention, there is provided an improved single lens reflex camera generally of the type wherein a mirror can be positioned at an angle between the rear of a taking lens and the film to reflect the rays of light that come through said lens, on to a focusing screen of a viewfinder, and can be positioned out of the way to expose the film, and wherein the improvement comprises:

means for supporting said mirror to swing forward toward the rear of said lens and downward to at least partially below the film, simultaneously, from its light-reflecting position to a non-reflecting inverted position substantially facing the bottom of said camera, whereby the back focus of the lens required to clear the mirror for movement from its light-reflecting position to out of the way to expose the film can be reduced (as compared to prior art devices).

DETAILED DESCRIPTION OF THE PREFERRED EMBODIMENT

The invention is disclosed as being embodied preferably in a single lens reflex 35 mm camera. Because such a camera is well known, this description is directed in particular to photographic elements forming part of or cooperating directly with the disclosed embodiment. It is to be understood, however, that other elements not specifically shown or described may take various forms known to persons of ordinary skill in the art.

Figure 1:
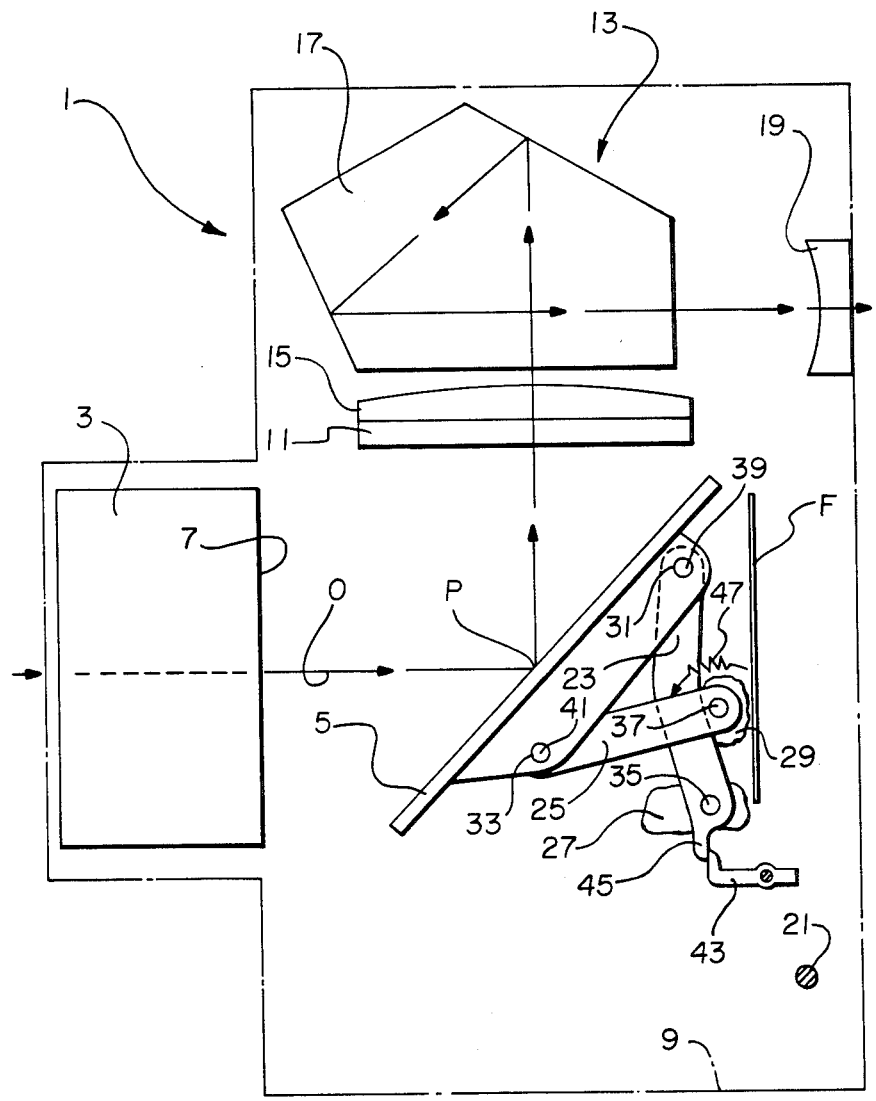
FIG. 1 is a side elevation view of the conventional optics in a single lens reflex camera, and an improved mirror system for use with the optics in accordance with a preferred embodiment of the invention.
Figure 3:
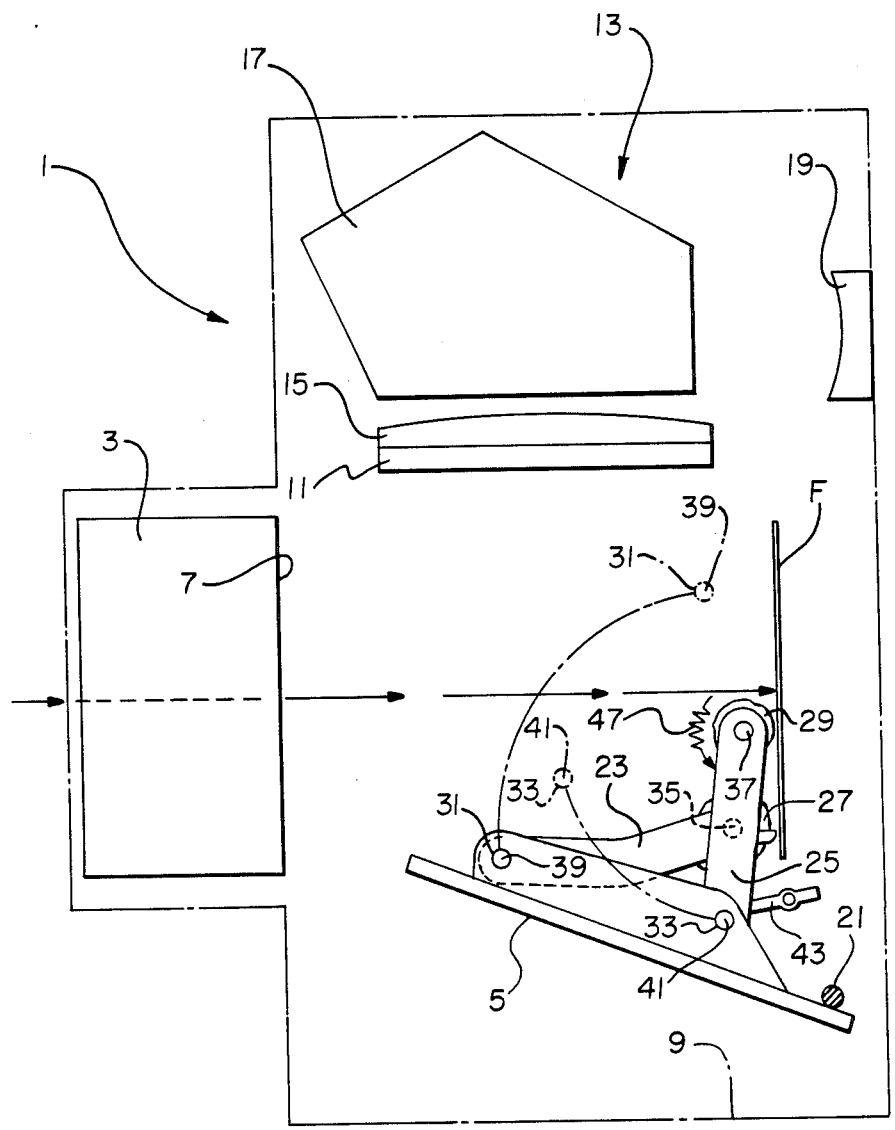

Referring now to the drawings, FIG. 1 shows certain elements of a single lens reflex 35 mm camera 1. The camera 1 includes an objective or taking lens 3 for focusing an image of the subject being photographed on a film frame F. Conventional means, such as a pressure plate and a pair of parallel rails, not shown, support the film frame F in the focal plane of the taking lens 3. A mirror 5 is normally located between the rear 7 of the taking lens 3 and the film frame F. The mirror 5 is disposed at an angle of approximately 45°, centered on the optical axis 0 of the taking lens 3, but it can be swung to an inverted position substantially facing the bottom 9 of the camera 1 and partially extending below the film frame F, as shown in FIG. 3. When the mirror 5 is positioned at the 45° angle, it reflects the rays of light that come through the taking lens 3, on to a ground glass screen 11 in a viewfinder 13 of the camera 1. A field lens 15 and a penta-roof prism 17 in the viewfinder 13 direct the light rays through an eyelens 19 at the rear of the camera 1 to enable the subject to be photographed to be viewed through the taking lens 3. The prism 17 has several reflecting surfaces which turn the image formed by the taking lens 3 on the ground glass screen 11 upright as well as right-way-round. When the mirror 5 is swung to its inverted position, the light rays from the taking lens 3 fall on the film frame F. The positioning of the mirror 5 is such that when an image of the subject to be photographed is focused on the ground glass screen 11, with the mirror at the 45° angle, the same image falls into focus on the film frame F when the mirror is swung out of the way.

If a conventional focal plane shutter, not shown, is employed in the camera 1, the protection of the film frame F against ambient light during viewing and focusing raises no special problems: the shutter blades cover the film frame at all times except during the actual exposure. As the mirror 5 is swung out of the way from its light-reflecting position shown in FIG. 1 to its inverted position shown in FIG. 3, the light rays fall only on the blind of the focal plane shutter, but as the mirror reaches the lower limit of its travel, it presses against a stop 21 which by known means, not shown, releases the shutter blades to make the exposure.

When the focal plane shutter is opened, with the mirror 5 in its inverted position, separate means must be provided for covering the underside of the ground glass screen 11 to prevent ambient light entering the prism 17 through the eyelens 19 from reaching the film frame F and to prevent the rays of light coming through the taking lens 7 from reflecting off the ground glass screen on to the film frame. Typical means for this purpose are a roller blind shutter or a special capping plate which is actuated to obscure the underside of the ground glass screen 11. Also, an auxiliary shutter or cover may be provided to close the eyelens 19.

If a conventional diaphragm shutter, not shown, is employed in the camera 1, rather than a focal plane shutter, the design requirements become more complex, since the shutter must be open for viewing and focusing, but still let no light through to the film frame F. This is achieved by a more involved shutter cycle and by the provision of a special capping plate which normally closes the film aperture, not shown, in the back of the camera 1 to cover the film frame F. The shutter cycle provides a possibility of continuous opening (for viewing and focusing) and normal opening and closing to control the exposure. During viewing, the shutter is open (and the lens diaphragm fully open as well), but the capping plate is closed to cover the film frame F. On pressing the release button to make the exposure, the shutter closes, the lens diaphragm closes down to a preselected aperture, the mirror and capping plate swing out of the way, and the shutter opens and closes again for the actual exposure. The capping plate may be used to obscure the underside of the ground glass screen 11 when it is swung out of the way.

According to the preferred embodiment of the invention, the mirror 5 is supported for its swinging movement by a pair of swing arms 23 and 25. The swing arms 23 and 25 are arranged crosswise of each other and are pivotally mounted on respective portions 27 and 29 of the body of the camera 1. In addition, the swing arms 23 and 25 are pivotally connected to the mirror 5 at (at least) two spaced locations 31 and 33, one generally above and the other generally below the point P on the mirror which intercepts the optical axis 0 of the taking lens 3 when the mirror is in its light-reflecting position, as shown in FIG. 1. Respective parallel pivot pins 35, 37, 39 and 41 serve to effect the two pivotal connections and the two pivotal mountings.

OPERATION (FIGS. 1-3)

Figure 2:
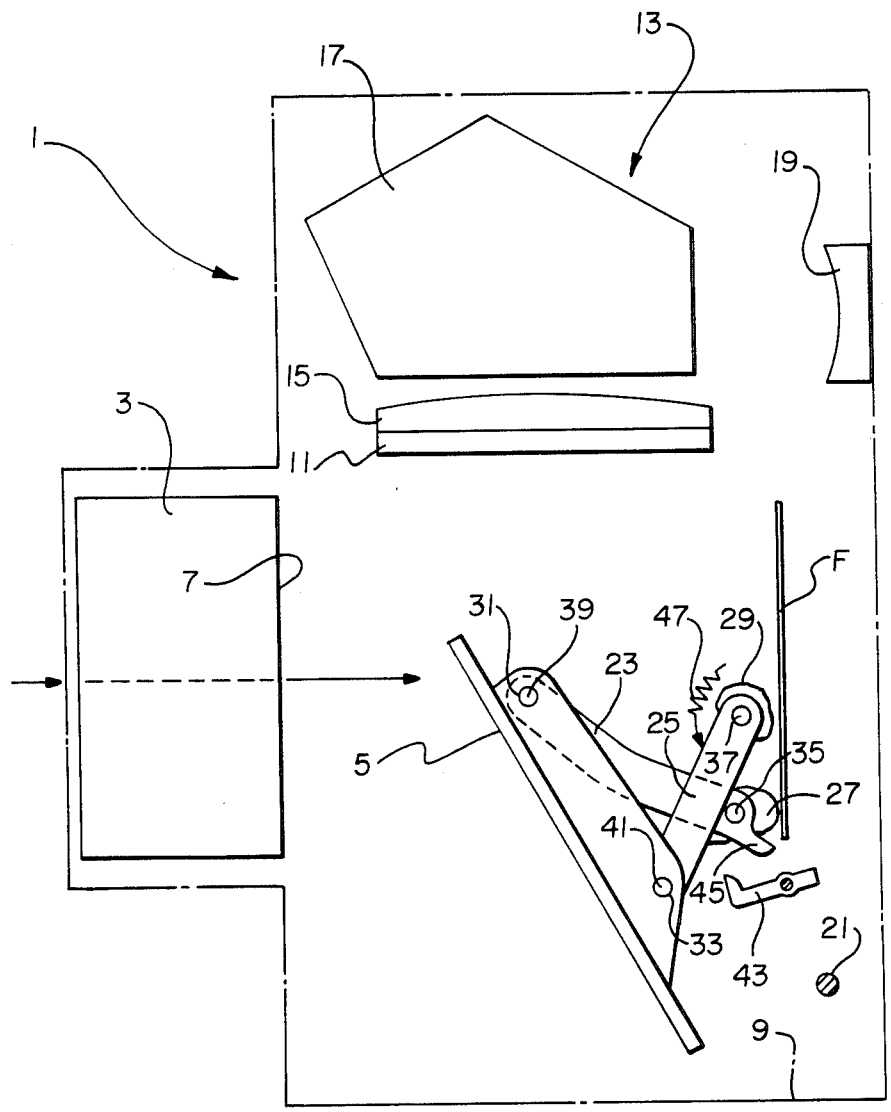
FIGS. 2 and 3 are views similar to FIG. 1, depicting successive stages of operation of the improved mirror system.

When the release button is pressed to make the exposure, a pivotally mounted latch 43 is pivoted by known means, not shown, in a counterclockwise direction in FIG. 1 to disengage from a finger-like portion 45 of the swing arm 23. This allows a spring 47 to pivot the swing arm 25 in a counterclockwise direction in FIGS. 1 and 2 at the pivot pin 37 and, in turn, similarly pivot the swing arm 23 in the same direction at the pivot pin 35. As a result, the mirror 5 is swung forward toward the rear 7 of the taking lens 3 and downward to partially below the film frame F, simultaneously, from its light-reflecting position in FIG. 1 to its inverted position in FIG. 3. As shown in FIG. 3, the mirror 5 is concurrently swung at its two locations 31 and 33 along respective arcs 49 and 51. More particularly, the mirror 5 is concurrently pivoted about two parallel axes, one of which is defined by the pivot pin 35 and the other of which is defined by the pivot pin 37.

To return the mirror 5 to its light-reflecting position in FIG. 1, from its inverted position in FIG. 3, there is provided known means, such as a drive motor and a cam assembly, not shown, which are automatically actuated after the exposure is made. The cam assembly is driven by the motor to rotate the mirror 5 in a clockwise direction in FIGS. 2 and 3 back to its light-reflecting position.

It will be appreciated that when the mirror 5 is swung from its light-reflecting position in FIG. 1 to its inverted position in FIG. 3, and vice-versa, it is swung in a way that reduces the clearance required for such movement as compared to prior art devices. This advantageously permits the back focus of the taking lens 3 required to clear the mirror 5 for its movement to be reduced, making it possible to reduce the front-to-back dimension of the camera 1.

The invention has been described in detail with particular reference to a presently preferred embodiment, but it will be understood that variations and modifications can be effected within the spirit and scope of the invention. For example, although the mirror 5 is supported for movement about two axes (respectively defined by the pivot pins 35 and 37), it is possible to support the mirror for movement about only a single axis (and yet achieve the same advantage).

We claim:

1. An improved single lens reflex camera of the type wherein a unitary mirror can be positioned at an upwardly inclined angle between the rear of a taking lens and the film to intercept the optical axis of said lens, to reflect the rays of light that come through the lens generally upward on to a focusing screen of a viewfinder, and can be positioned out of the way to expose the film, and wherein the improvement comprises:

means for supporting said entire mirror to swing forward toward the rear of said lens and downward to at least partially below the film, simultaneously, from its light-reflecting position to a non-reflecting inverted position substantially facing the bottom of said camera, whereby the back focus of the lens required to clear the mirror for movement from its light-reflecting position to out of the way to expose the film can be reduced.

2. The improvement as recited in claim 1, wherein said supporting means includes respective swing means for swinging said mirror at two spaced locations, one generally above and the other generally below a point on the mirror which intercepts the optical axis of said lens when said mirror is in its light-reflecting position.

3. The improvement as recited in claim 1, wherein said supporting means includes respective swing arms pivotally connected to said mirror at two spaced locations, one generally above and the other generally below a point on the mirror which intercepts the optical axis of said lens when said mirror is in its light-reflecting position, for swinging said mirror at the two locations along corresponding arcs.

4. The improvement as recited in claim 3, wherein said swing arms are continuously disposed crosswise of each other.

5. The improvement as recited in claim 1, wherein said supporting means supports said mirror to swing about two parallel axes.

6. An improved single lens reflex camera of the type wherein a mirror can be positioned at an angle between the rest of a taking lens and the film to reflect the rays of light that come through said lens on to a focusing screen of a viewfinder, and can be positioned out of the way to expose the film, and wherein the improvement comprises:

means for supporting said mirror to swing at two spaced locations, one generally above and the other generally below a point on the mirror which intercepts the optical axis of said lens when the mirror is in its light-reflecting position, in directions forward toward the rear of said lens and downward to at least partially below the film, simultaneously, from its light-reflecting position to a non-reflecting inverted position substantially facing the bottom of said camera, whereby the back focus of the lens required to clear the mirror for movement from its light-reflecting position to out of the way to expose the film can be reduced.

7. An improved single lens reflex camera of the type wherein a mirror can be positioned at an angle between the rear of a taking lens and the film to reflect the rays of light that come through said lens, on to a focusing screen of a viewfinder, and can be positioned out of the way to expose the film, and wherein the improvement comprises:

means for supporting said mirror to swing forward toward the rear of said lens and downward to at least partially underneath the film, simultaneously, from its light-reflecting position to a non-reflecting inverted position substantially facing the bottom of said camera, whereby the back focus of the lens required to clear the mirror for movement from its light-reflecting position to out of the way to expose the film can be reduced.

* * * * *